United States Patent

[11] 3,576,329

[72] Inventor Simeon D. Weaver
 Birmingham, Ala.
[21] Appl. No. 779,098
[22] Filed Nov. 26, 1968
[45] Patented Apr. 27, 1971
[73] Assignee Cement Asbestos Products Comapny
 Woodward, Ala.
 Continuation-in-part of application Ser. No.
 530,166, Feb. 25, 1966, now abandoned.

[54] PIPE PACKING JOINT WITH GASKET PROVIDING COMBINED DEFORMATION AND LIP SEALS
 1 Claim, 9 Drawing Figs.

[52] U.S. Cl. .................................................. 277/207,
 285/231
[51] Int. Cl. ................................................. F16j 15/48
[50] Field of Search .......................................... 277/207,
 207 (A), 205, 212, 212 (C); 285/110, 111, 231,
 345, 350

[56] References Cited
 UNITED STATES PATENTS
 2,953,399 9/1960 Weaver et al. ................. 277/227

FOREIGN PATENTS
1,415,265 9/1965 France ........................

Primary Examiner—William F. O'Dea
Assistant Examiner—Robert I. Smith
Attorney—Raphael Semmes ABSTRACT: A packing joint for complementary male and female pipe sections, having an annular gasket of compressible material adapted to fit within an annular groove in the female section for engagement with the periphery of the inserted male section. The longitudinally central portion of the gasket forms a torus or thickened area for compression between the male and female pipe sections, and its inner periphery at one end is cut away adjacent the torus to provide an annular void which is bounded by the torus and surrounds the male section. The outer periphery of the gasket is provided at both ends with radially thickened annular rims which sealingly engage the inner periphery of the groove in the female section, and the area of the gasket between the rims is provided with a portion of reduced thickness inward of each rim, the peripheries of which reduced portions converge radially outwardly in an apex longitudinally aligned with the rim peripheries. When the male section is inserted, the torus is compressed, and a portion thereof is deflected into lip-sealing engagement with the male section, while the rims at each end of the gasket prevent any rolling or displacement of the gasket during assembly.

PATENTED APR 27 1971 3,576,329
SHEET 1 OF 2
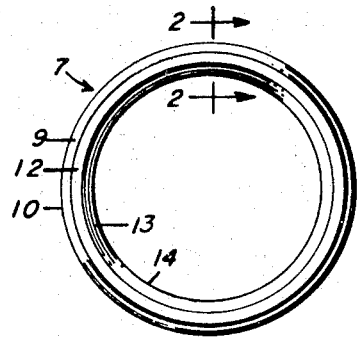
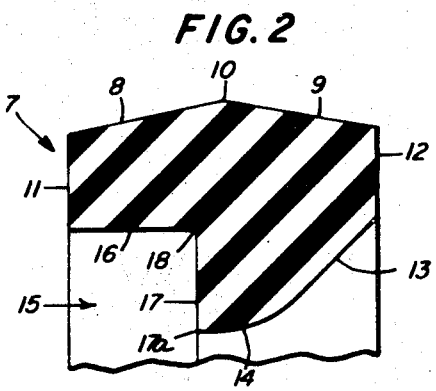
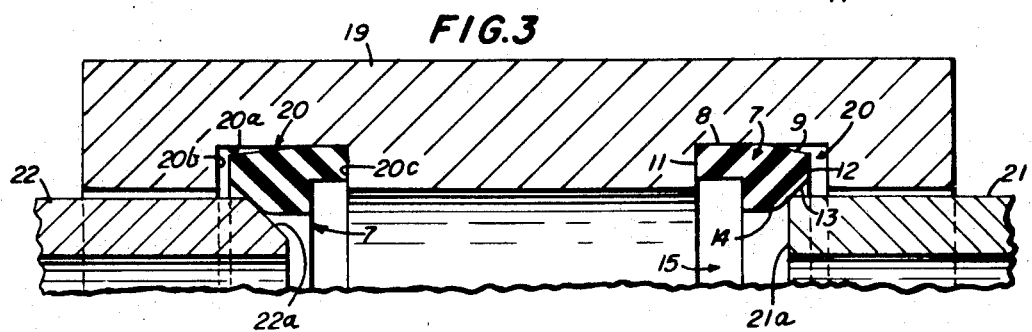
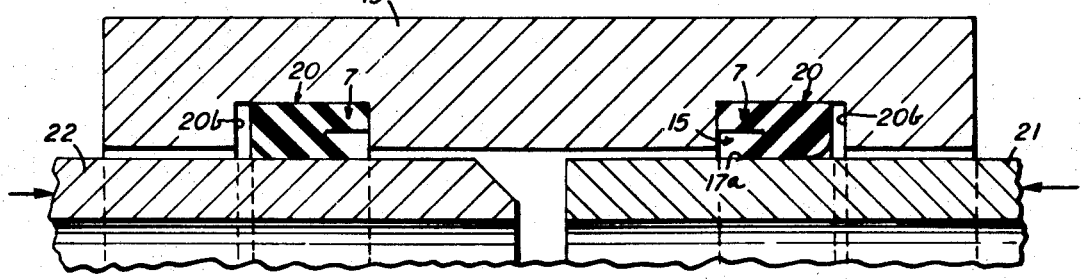
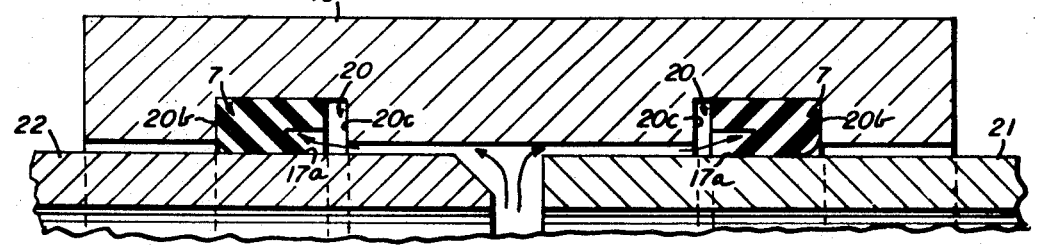
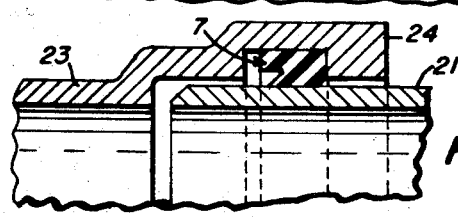
INVENTOR
SIMEON D. WEAVER
BY Raphael Semmes
ATTORNEY 3,576,329

PIPE PACKING JOINT WITH GASKET PROVIDING COMBINED DEFORMATION AND LIP SEALS

This application is a continuation-in-part of my copending application Ser. No. 530,166, filed Feb. 25, 1966 and now abandoned.

BACKGROUND OF INVENTION

This field of packing joints has advanced from lead caulked joints, cement joints, lead sulfur joints, bolted mechanical joints, etc. to compression-type rubber or other elastomeric joints. Generally, the developments in compression joints have been concentrated in two directions, one being the O-ring joint and the other the lip-seal-type of joint. While workable joints have been developed along both of these lines, they have all encountered certain drawbacks and disadvantages. For example, the principal disadvantage of the conventional O-ring-type joint resides in the assembly pressures required and the fact that the gasket is inclined to roll out of position during assembly. Also, these O-ring-type joints require relatively close dimensional tolerances of mating parts, and extreme difficulty is often encountered during assembly, particularly with blunt end pipe sections.

The main disadvantages of the lip-seal reside in the inability to withstand vacuum and negative pressures in service, hazards of infiltration from negative pressures and adequate support between mating parts afforded by a lip-seal gasket.

Conventional water main service conditions require joints having gaskets capable of sealing under high pressures and vacuum or negative pressure conditions. Satisfactory pipeline installation can best be accomplished with a joint which is easily coupled in the field with factory or field-cut ends, using moderate assembly pressures and under adverse trench and weather conditions, and, at the same time, seals under all conditions of positive and negative pressures.

SUMMARY OF INVENTION

This invention relates to packing joints of the type employed in joining sections of pipe, including the use of coupling sleeves for joining two pipe sections respectively, provided with spigot and bell ends. The invention is adaptable for use with pipe and fittings formed of cast iron, asbestos cement, clay, metal, plastics or other piping materials.

More particularly, the invention embodies an improvement over the invention of my form U.S. Pat. No. 2,953,399, issued Sept. 20, 1960, which disclosed a packing joint wherein the gasket was provided with a torus in its center portion, composed of relatively soft rubber having fore and aft rims of harder rubber or rubber and fabric designed to limit the rolling of the gasket and provide anchoring means.

Both forms of the present invention embody the torus or centrally thickened portion of the gasket which performs the dual purpose of an O-ring and a lip-seal due to the fact that the inner periphery of the gasket adjacent the torus is cut away to provide an annular void which is bounded by the torus and surrounds the male section. In one embodiment of the invention, the gasket is in such a form that a cross section through any segment thereof has a substantially diamond shape, truncated at its fore and aft ends to form parallel end faces with the obtuse angles of the diamond defining the inner and outer peripheral surfaces of the gasket. This form permits a limited rolling action of the gasket during assembly.

In another form of the invention, the torus and cutaway portion of the inner periphery of the gasket are substantially the same as in the form first referred to. However, the outer periphery of the gasket which engages the groove in the female member of the coupling is provided at both ends with radially thickened annular rims which sealingly engage the inner periphery of the groove, and the area of the gasket between the rims is provided with a portion of reduced thickness inward of each rim. The peripheries of these reduced portions converge radially outwardly in a central apex, longitudinally aligned with the end rim peripheries. The rims prevent any rolling action at all during assembly of the joint.

It is the primary object of the present invention to provide a joint embodying a single gasket capable of performing the functions of both a lip-seal and an O-ring seal, and which will eliminate the disadvantages inherent in conventional gaskets of both of these types, while, at the same time, retaining the advantageous feature of both.

Another object of the invention is to provide a pipe joint including a specially designed gasket which may be assembled with moderate force, utilizing a coupling ring or a female pipe section with a male pipe section having either a tapered or blunt end.

A further object of the invention is to provide a joint which will effect a positive seal under all conditions of both positive and negative pressures and with a wide range of joint dimension tolerances.

Still another object of the invention is to provide an economical pipe joint which can be easily assembled by unskilled workers without the use of special tools.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout the several views:

FIG. 1 is an end view of one form of gasket employed in the pipe joint of the present invention;

FIG. 2 is an enlarged, fragmentary, sectional view taken on line 2—2 of FIG. 1;

FIG. 3 is a fragmentary, longitudinal, sectional view illustrating a joint in the course of assembly, for purposes of illustration, employing one male pipe section with a tapered end, and one with a blunt end, being inserted in opposite ends of a common coupling sleeve;

FIG. 4 is a similar view of the assembled joint with each gasket compressed and the coupling subjected to moderate or negative hydrostatic pressure;

FIG. 5 is a view similar to FIG. 4, but illustrating the gasket when the joint is subjected to high, internal, hydrostatic pressure;

FIG. 6 is a fragmentary, sectional view showing the gasket assembled in the bell of one pipe section on the mating end of a spigot section;

DETAILED DESCRIPTION

Figure 7:
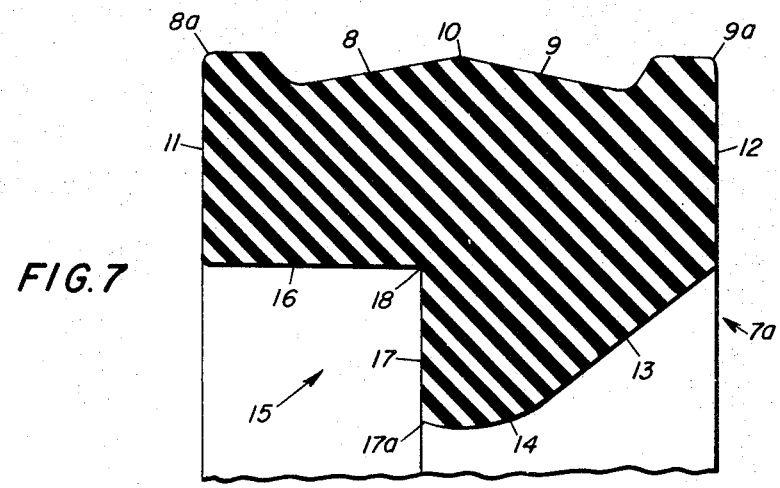
FIG. 7 is an enlarged sectional view similar to FIG. 2, but illustrating a modified embodiment of the gasket.

In the drawings, referring first to FIGS. 1 and 2 which illustrate one form of the invention, the gasket is generally designated by the numeral 7 and consists of an annular ring of rubber or other elastomeric material which is readily deformable between the mating ends of two pipe sections. The outer periphery of the gasket is formed with two adjoining smooth surfaces 8 and 9 which diverge from a central high point 10 toward the longitudinal axis of the gasket, defining an obtuse angle in cross section. The fore and aft end faces of the gasket 11 and 12, respectively, are preferably parallel and contiguous with the diverging peripheral surfaces 8 and 9.

In effect, in a cross section through any segment of the gasket, it defines a modified truncated diamond shape with the obtuse angles forming the inner and outer peripheries of the gasket and its fore and aft ends cut off.

The axial extremity of the aft side face 12 of the gasket is joined by an angularly, inwardly directed, annular face 13 which terminates at its axial extremity in a torus 14 which bounds the inner periphery of the gasket and lies substantially radially opposite the high point 10 on the outer periphery of the gasket. Thus, the central portion of the gasket is radially thicker in cross section than the remainder thereof.

The forward side of the gasket is annularly recessed as at 15 from the axial extremity of the side face 11 to a point adjacent the torus 14. This recess is bounded by an annular wall 16 and a radial wall 17 which meet at right angles, as at 18, substantially centrally of the body of the gasket. Also, the annular face 16 is of slightly greater depth than that of the radial face 17. The junction of the radial face 17 and torus 14 defines a lip-seal portion 17a for sealing engagement with the periphery of a male pipe section, as will later appear.

Referring now to FIG. 3, this gasket may be utilized in a joint embodying a coupling sleeve, such as 19, the inner periphery of which is provided adjacent its opposite ends with inwardly spaced, annular grooves 20 for receiving the gaskets of the invention. The sleeve 19 is designed to receive the ends of two pipe sections 21 and 22, and its inner diameter is sufficiently greater than the outside diameters of these pipe sections to readily receive the same with a sliding fit when the latter are forced inwardly in the sleeve. To illustrate the adaptability of the invention for use in connection with blunt end pipes, as well as bevel end pipes, FIG. 3 shows pipe section 21 with a blunt end 21a and pipe section 22 with a beveled end 22a.

The outside diameter of the gasket 7 is preferably slightly larger than the diameter of the bottom wall 20a of groove 20, and the inside diameter of the gasket at the torus 14 is less than the outside diameter of the mating ends of pipe sections 21 or 22, The radial thickness of the gasket is less than the axial length of the gasket, and the gasket construction in cross section has its radial point of greatest diameter and thickness in the midportion of the gasket, as previously stated. The longitudinal dimension of the groove 20, between its forward and aft end walls 20b and 20c respectively, is slightly greater than the corresponding fore and aft dimension of the gasket, for the purpose hereinafter explained.

In describing the assembly of this form of the joint of the present invention, reference will be made to only one gasket and the related mating parts of the pipe sections, it being apparent from the foregoing that the principle involved may be embodied in a coupling sleeve arrangement with two gaskets for joining two sections of pipe, as shown in FIGS. 3—5 inclusive, or in a simple bell and spigot joint, as shown in FIG. 6, which embodies only one gasket. Thus, a description of one gasket and the related parts will suffice for a clear understanding of the invention.

The gasket 7 is first inserted in the groove 20 under a slight compression with the apex 10 of its converging peripheral surfaces in engagement with the bottom wall 20a of the groove 20, and the thickened area bounded inwardly by the torus 14 projecting radially inwardly beyond the fore and aft walls 20b and 20c of the groove. The end of the male pipe section or spigot 21 is then inserted in the central opening of the gasket, and as its end 21a abuts the angular face of the gasket, continued inward force deflects the thickened area of the gasket and torus 14 forwardly to flow into the void formed by the annular recess 15. This causes a rolling compression of the body of the gasket, as seen in FIG. 4, and, in addition, forms a lip-seal at 17a with the periphery of the spigot section 21. Thus, during inward movement of pipe section 21, the angle between surface 13 and the pipe periphery is gradually reduced so that when the joint is completely assembled, this angle between most of the surface 13 of the gasket and the periphery of pipe section 21 is ultimately reduced to zero. In this position, the pipe section slides easily through the gasket as the end of the pipe is rolled completely to the point of maximum gasket compression. Thus, when in final assembled position, the thickened portion of the gasket functions substantially in the manner of an O-ring, and the lip seal 17a provides the added sealing function of a lip-seal gasket.

Experience has shown that the assembly forces required to roll and compress the gasket portion bounded by faces 13 and 17 and torus 14, when inserting a blunt end pipe section such as 21, are of approximately the same magnitude as the forces required to compress the same gasket portion when used with a tapered pipe section such as at 22. It was also found that after assembly and upon application of high internal hydrostatic pressure, the gasket is forced into the same sealing relation when using either a blunt end or taper end pipe.

As shown in FIG. 4, the gasket 7 has been pushed forward in the groove 20 into engagement with the forward wall 20b of the groove and is compressed in sealing contact with the mating section of pipe under moderate or negative hydrostatic pressure. In FIG. 5, high internal hydrostatic pressure is encountered, and the gasket has shifted aft in the groove 20 into engagement with end wall 20c, and, due to the recess 15 and lip seal 17a, a double sealing action, namely, an O-ring seal and a lip seal, is effected.

FIG. 6 has been included simply to illustrate the adaptability of the present invention to a bell and spigot-type joint comprising the spigot section 21 and the bell section 23, the bell portion 24 of which receives the gasket 7.

It will be apparent that the design of the gasket of the present invention with both a lip seal and a compression or O-ring-type sealing section, resulting from the provision of the right angular recess 15 to accommodate deformation and flow of excess material, is responsible for the relatively moderate and uniform pressures required for assembly with either tapered or blunt pipe ends and for accommodating a wide range of dimensional tolerances. Under varying radial compression conditions and dimensional tolerances, radial compression is imposed on the gasket between the bottom wall 20a of the coupling groove and the outer periphery of the male pipe section 21, and the lip 17a forms a seal around the periphery of the pipe section 21 which is responsive to high internal hydrostatic pressure.

Figure 8:
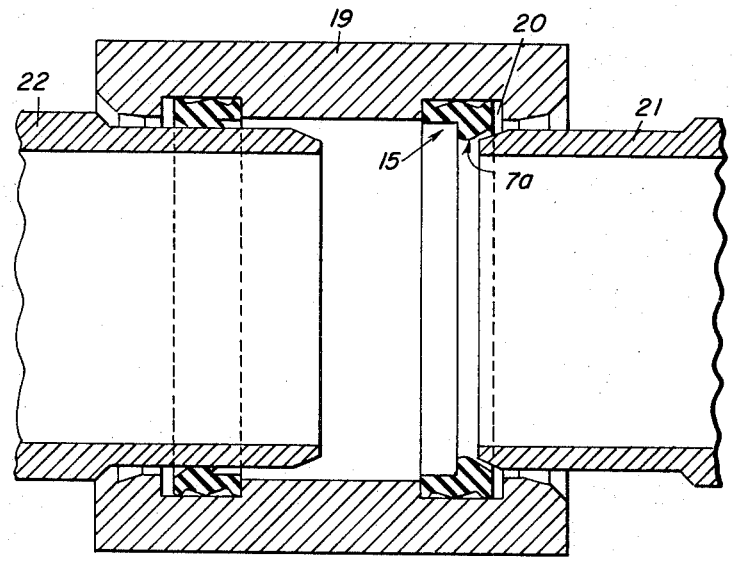
FIG. 8 is a view similar to FIG. 3, showing the modified gasket in the course of assembly.
Figure 9:
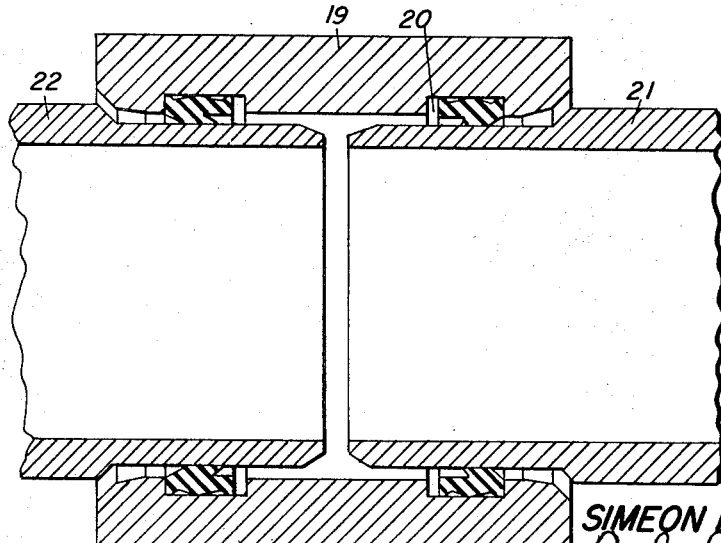
FIG. 9 is a similar view showing the modified joint completely assembled with the gasket in final position under positive pressure.

Referring now to FIGS. 7—9 inclusive, which illustrate the modified form of gasket 7a of the present invention, it will be seen that the central portion of the gasket comprising the thickened area between the high peripheral point or apex 10 and the torus 14 and the annular recess 15 are substantially the same as in the form of the invention previously described. As in FIG. 2, this recess is bounded by an annular wall 16 and a radial wall 17 which meet at right angles at 18, substantially centrally of the body of the gasket. Also, the annular face 16 is of slightly greater depth than that of the radial face 17. The junction of the radial face 17 and torus 14 defines a lip-seal portion 17a for sealing engagement with the periphery of a male pipe section being joined.

However, as distinguished from the limited or controlled rolling action of the previously described gasket during assembly, this modified embodiment of gasket is designed to completely eliminate rolling and to thus insure against a lip-seal blowout. As best seen in FIG. 7, in the modified form of gasket, the diverging peripheral surfaces 8 and 9 extending from the apex or high point 10 terminate on either side of the gasket in annular rims 8a and 9a respectively, which extend radially outwardly with their peripheral surfaces longitudinally aligned with the high point 10 of the thickened area of the gasket. Thus, as seen in FIG. 8, when the gasket is inserted into the groove 20 of the sleeve or female member 19, the rims 8a and 9a engage the bottom wall of the groove, stabilizing the gasket in the groove, and prevent any rolling of the main portion of the gasket during assembly, in contrast to the controlled rolling in the previously discussed design.

The effect of the rims 8a and 9a of the modified form in preventing rolling of the gasket will best be understood by comparison of FIG. 8 and FIG. 3. In FIG. 3 embodying the gasket without the rims, it will be seen that when the gasket is inserted in the groove and the male pipe section 21 is inserted, the gasket rolls slightly until peripheral surface 8 rests upon the bottom wall of the gasket and is parallel with the axis of both the male and female sections. As distinguished from this, it will be seen from FIG. 8 that when the male section 21 is inserted in the female section, the inclined surface 8 remains inclined and the gasket is prevented from rolling by contact of the rim 8a with the bottom wall of the groove. Thus, the rims 8a and 9a coact with the bottom wall of the groove to maintain the surfaces 8 and 9 of the gasket in their inclined relation to the bottom wall of the groove. The reduced radial thickness of the gasket, fore and aft of the apex 10 and torus 14, requires less assembly pressure, and the rim 8a completely eliminates any tendency to displace the gasket by rolling during assembly.

Furthermore, the inclined surfaces 8 and 9 on either side of the apex 10 facilitate the cooperation of the apex with the torus 14 in effecting an O-ring-type seal. As seen in FIG. 9, when the joint is completely assembled, we have the O-ring-type seal adjacent the apex 10 and the lip seal effected by the torus 14 deflecting into the void 15. Both rims 8a and 9a are firmly in contact with the bottom wall of the groove so as to prevent any tendency for the gasket to roll and allow a lip seal to blowout. Also, the entire outer end of the gasket enlarged by rim 9a insures against blowout of the entire gasket between the inner diameter of the female section and the outer diameter of the male section, with dimensional tolerances far in excess of existing standards.

From the foregoing, it is believed that the invention may be readily understood, it being borne in mind that in both forms of the invention, the geometrical shape of the gasket is designed to provide a combination of an O-ring-type seal and a lip seal.

I claim:

1. A pipe packing joint comprising complementary male and female sections, an annular groove in said female section having fore and aft end walls and a cylindrical bottom wall, an annular gasket of elastomeric, deformable material insertable in said groove of a width less than that of said groove, the outer periphery of said gasket being provided at its fore and aft ends with integral, radially projecting, annular supporting rims, slidably engageable with the bottom wall of said groove to prevent rolling of said gasket therein, the fore and aft surfaces of the periphery of said gasket being axially inclined from a central, annular apex aligned with the peripheries of said rims to points adjacent the respective rims, said gasket being centrally thickened to form a torus on its inner periphery, radially aligned with said apex, the aft end of said gasket being joined at its inner radial extremity by an inwardly, axially inclined, annular abutment face which merges with and partially forms said torus, the inner radial extremity of the fore end face and the adjacent portion of the torus of said gasket being cutaway to form an annular void into which said torus is partially deflected upon deformation of the gasket to form a sealing lip for engagement with said male section, the radial thickness of said gasket, at least in the area bounded by said torus, being greater than the radial depth of the groove in said female section, and its inner diameter being less than the outer diameter of said male section, whereby, when said gasket is in place in said groove and said male section is longitudinally forced therein, the end of the latter engages said abutment face, forcing said gasket forward into contact with the corresponding end wall of said groove, simultaneously deflecting said torus and sealing lip into said void to partially fill the latter while engaging the male section with a lip seal, and deforming the torus of said gasket between the outer periphery of said male section and the bottom wall of said groove.